Sept. 3, 1929.  F. A. HOWARD  1,727,303
PREPARING HYDROCARBON PRODUCTS
Filed April 25, 1924
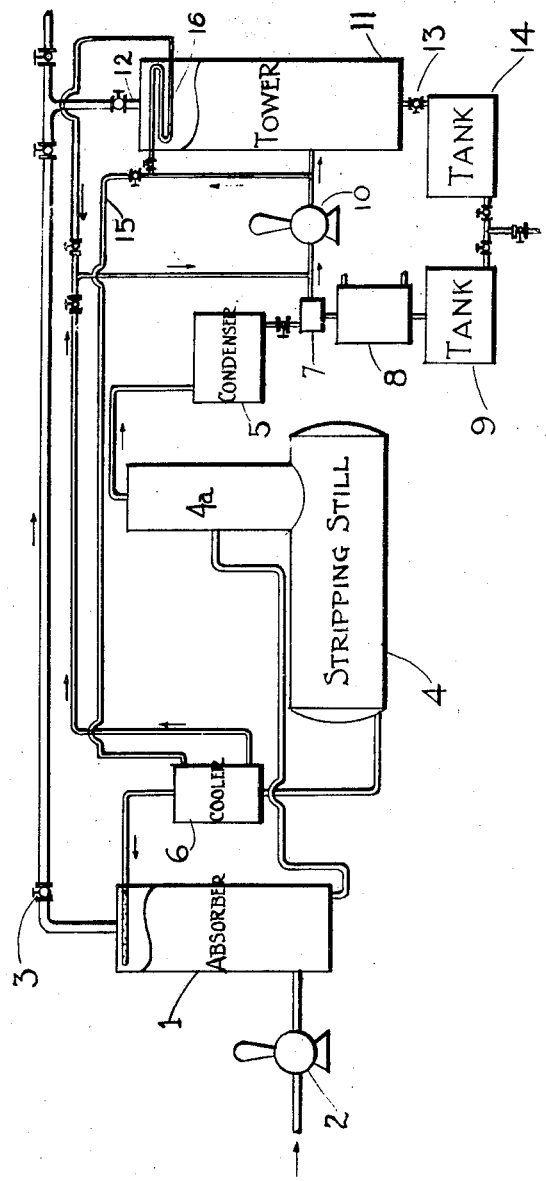
Inventor
Frank A Howard
By
Attorney Patented Sept. 3, 1929.

1,727,303

UNITED STATES PATENT OFFICE.

FRANK A. HOWARD, OF ELIZABETH, NEW JERSEY, ASSIGNOR TO STANDARD OIL DEVELOPMENT COMPANY, A CORPORATION OF DELAWARE.

PREPARING HYDROCARBON PRODUCTS.

Application filed April 25, 1924. Serial No. 708,926.

This invention relates to the art of preparing hydrocarbon products, and more particularly hydrocarbons having comparatively low boiling points. The invention will be understood from the following description, taken in connection with the accompanying drawing which represents schematically one arrangement of apparatus which may be used.

In proceeding in accordance with my invention a gas from which it is desired to separate condensible constituents, as for example a natural gas or a refinery tail-gas, is brought into contact with an absorber menstruum in an absorber tower 1, a compressor 2 being used if higher compression of the gas is desired before admission to the tower. The denuded gas leaves the absorber 1 through the pressure control valve 3 (where such is required) into the line.

The absorber menstruum of suitable character, for example a mineral seal petroleum oil, takes up available hydrocarbons from the gas and is passed to a stripping still 4 where it is heated to drive off the absorbed constituents. In the drawing I have shown the still 4 as being provided with a dephlegmating column 4ª and the absorbent carrying its absorbed hydrocarbons may conveniently be passed to the still directly or by introducing it into the column 4ª. The column 4ª may contain baffles or an arrangement for exposing large surfaces to the vapors and liquid brought together therein. The absorbed constituents pass off as vapor from the tower of the still to a condenser 5 which is maintained under pressure. The stripped absorber menstruum is returned from the stripping still 4 through a cooler 6, to be introduced into the top of the absorber to again take up constituents from the gas.

From the condenser 5 the condensate and uncondensed vapors pass to a separator 7, from which the condensate goes through a cooler 8 to a storage tank 9. The condenser 5 is maintained at such a temperature as to condense out substantially all of the heavier constituents collected by the absorber oil without condensing any large proportion of the intermediate constituents, and as a cooled product would have a relatively low vapor tension, for example around 2 lbs. at normal temperatures. The uncondensed vapors and gases passing on from the condenser 5 are then compressed by a compressor 10 to a relatively high pressure, for example 200 lbs. and are introduced into a suitable dephlegmator or rectifying apparatus 11 preferably in the form of a tower cooled at the top and affording washing contact between vapors and condensing fractions, so as to make a separation such that the gas passing out at 12 to the line will contain only small quantities, if any, of the intermediate hydrocarbons and substantially all of the lighter constituents, while the product drawn off from the bottom at 13 into the storage tank 14 is made up principally of intermediate hydrocarbons such as butane and pentane, and corresponds in general to the commercial products known as liquefied gases, having a relatively high vapor tension, for instance 20–25 lbs. at normal temperatures.

The cooling required in the dephlegmator 11 can be provided in any suitable manner, for instance by permitting a portion of the compressed hydrocarbons from the compressor 10 to expland in refrigeration coils 16 in the top of the dephlegmator tower, to be thence turned back to the compressor if desired. The absorber oil can be similarly cooled as shown by expansion line 15 if desired.

By mixing in suitable proportions the liquefied product from the tank 14 with the condensate from tank 9 a product may be obtained having any desired intermediate vapor tension, to comply with shipping or market requirements, etc. Such mixing should be carried out under a pressure equal to or exceeding the vapor pressure of the product in the tank 14, to avoid losses during the mixing process.

I claim:

1. The improvement in the art of preparing hydrocarbon products from hydrocarbons principally in the vapor phase, separated from hydrocarbon gas by absorption which comprises condensing out a fraction having a relatively low vapor tension, cooling said fraction out of contact with the uncondensed vapors and gases, compressing the said uncondensed vapors and gases and subjecting them to a rectifying action to obtain a liquefied product of relatively high vapor tension, and finally mixing said liquefied product with the aforesaid fraction having a relatively low vapor tension.

2. The improvement in the art of preparing hydrocarbon products which comprises passing condensable constituents of natural gas through a condensing zone, reducing the temperature therein to condense a liquid phase consisting principally of constituents of higher boiling point than butane and pentane, cooling said liquid phase out of contact with the uncondensed vapors and gases, compressing uncondensed constituents, subjecting them to a rectifying action to obtain a liquefied product of relatively high vapor tension and blending the liquid phase first mentioned with the product of relatively high vapor tension to produce a gasoline of intermediate volatility.

3. The improvement in the art of preparing hydrocarbon products, which comprises passing condensable constituents of natural gas through a condensing zone, reducing the temperature therein to condense a liquid phase consisting principally of constituents of higer boiling point than butane and pentane, conducting away and compressing the uncondensed constituents, subjecting the uncondensed constituents to a rectifying action to obtain a liquefied product of relatively high vapor tension, and blending the liquid phase first mentioned with the product of relatively high vapor tension to produce a gasoline of intermediate volatility.

FRANK A. HOWARD.